E. S. WHEELER.
PRESSURE GAGE.
APPLICATION FILED JAN. 8, 1906.
899,932.
Patented Sept. 29, 1908.
2 SHEETS—SHEET 2.
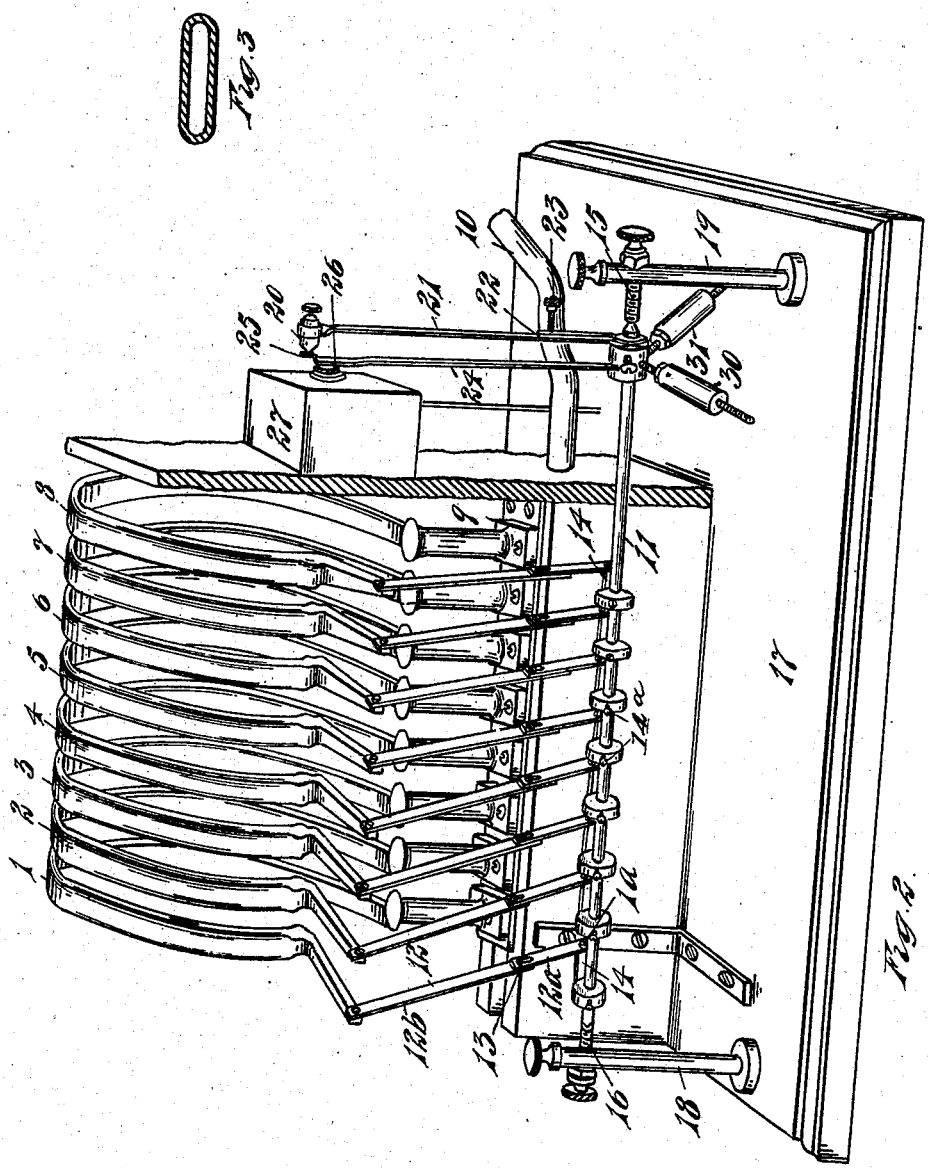
WITNESSES
C. E. Day.
Lotta Lee Hayton.
INVENTOR
Eben S. Wheeler.
By
Parker & Burton, Attorneys.

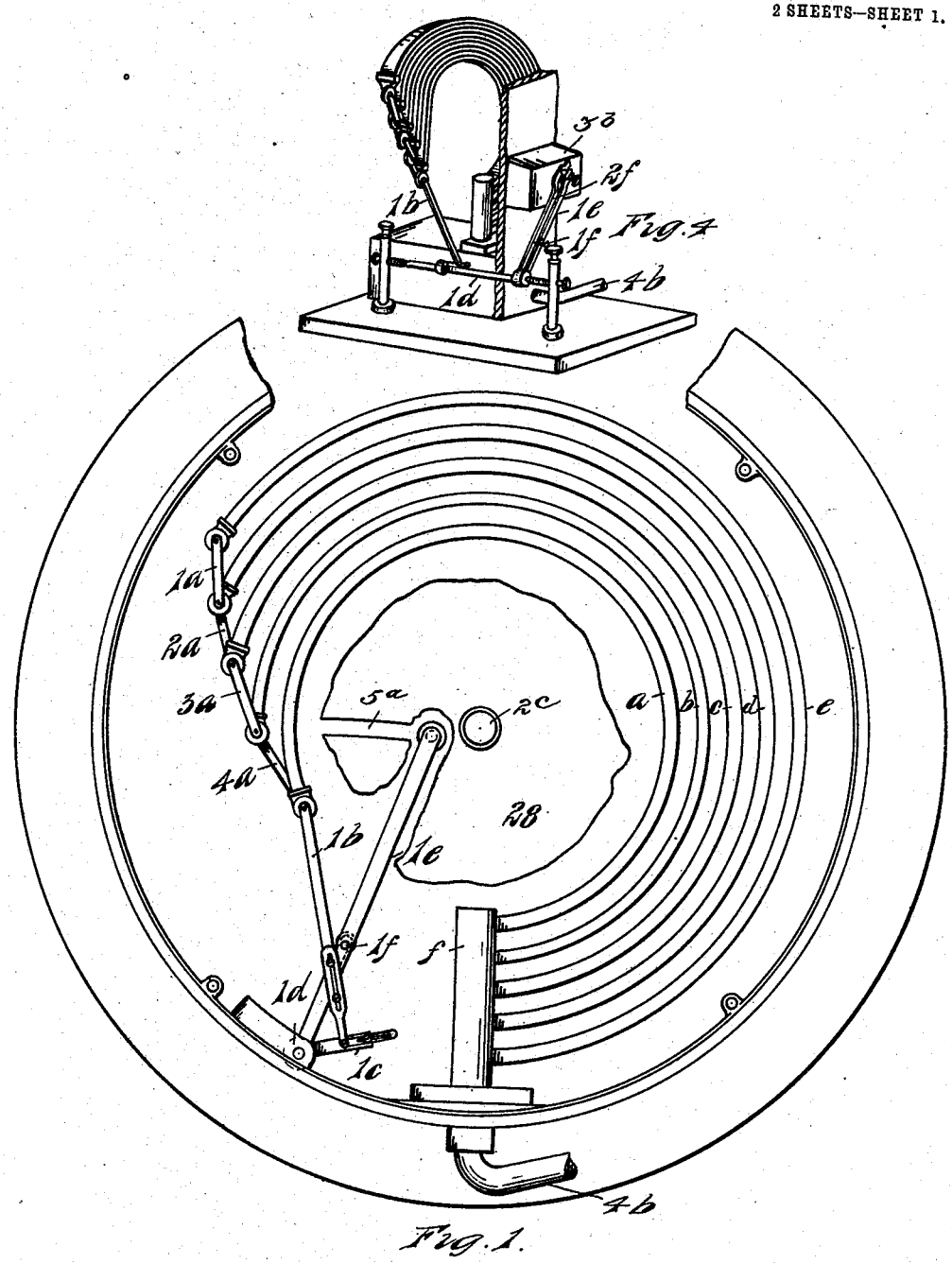

UNITED STATES PATENT OFFICE.

EBEN S. WHEELER, OF DETROIT, MICHIGAN.

PRESSURE-GAGE.

No. 899,932.  Specification of Letters Patent.  Patented Sept. 29, 1908.

Application filed January 8, 1906. Serial No. 295,017.

*To all whom it may concern:*

Be it known that I, EBEN S. WHEELER, a citizen of the United States, residing at Detroit, county of Wayne, State of Michigan, have invented a certain new and useful Improvement in Pressure-Gages, and declare the following to be a full, clear, and exact description of the same, such as will enable others skilled in the art to which it pertains to make and use the same, reference being had to the accompanying drawings, which form a part of this specification.

This invention relates to pressure gages for bathometers.

It has for its object an improved pressure gage and automatic recording apparatus connected therewith to be used in recording the pressure produced in bathometers.

In the ordinary pressure gage, having an indicating or recording apparatus connected therewith, especially if there be a recorder, difficulty has been found in constructing a gage with sufficient range of movement, and at the same time with sufficient strength of action to produce the record on so large a scale that it may be readily read for small variations of pressure. The usefulness of such a gage for measuring and recording small variations of pressure, of only a few ounces variation, has been demonstrated in attempts to use such gages in connection with bathometers actuated by pressure of the depth of water.

I accomplish the desired result by making the pressure actuated spring of considerable flexibility and of considerable range of movement, and I connect up a number of springs to a single rock-shaft from which an arm extends that carries the recording instrument.

In the drawings:—Figure 1, shows a battery of springs arranged in concentric order and connected to a recorder. Fig. 2, shows a battery of springs connected to a recorder, the springs being arranged side by side. Fig. 3, is a cross-section of one of the tubes. Fig. 4, is a perspective detail of the coupling between the tubes and the record lever.

In the form shown in Fig. 1, the Bourdon springs $a$, $b$, $c$, $d$, and $e$ open out from a manifold pipe $f$, through which the fluid, whose pressure is to be measured, is admitted into the spring tubes from the conducting or bathometer tube $4^b$. The free ends of the Bourdon tubes are connected in series by links $1^a$, $2^a$, $3^a$, and $4^a$. The innermost of the tubes $a$ is connected by a link $1^b$ to the arm $1^c$, which extends from a rock shaft $1^d$. The rock shaft is provided with a pencil-carrying arm $1^e$, and with an arm carrying a tablet $2^f$. The pressure of the pencil against the tablet $2^f$ is regulated by adjustment of the screw $1^f$. The sheet upon which the record is to be made is placed against a plate 28 with which the shaft $2^c$ is concentric, the shaft being driven by clock work in the case $3^b$. The plate 28 does not rotate; its lower portion projects between the arm of tablet $2^f$ and the arm which carries the recording pencil. The tablet $2^f$ lies just within a slot $5^a$ in the plate 28, and presses through the slot against the back of the paper. The tablet and both of the arms swing on the rock shaft $1^d$.

In Fig. 2, the numerals 1, 2, 3, 4, 5, 6, 7, 8, indicate a number of Bourdon springs, each of which is connected to a manifold 9, into which the fluid whose pressure is to be measured, is admitted through pipe 10. The free end of each spring is linked to an arm 14, from a rock shaft 11. The free end of the spring 1, has pivotally connected to it an adjustable link 12, made in two pieces $12^a$ and $12^b$; these are united by a sliding joint 13, and the link is pivoted to rock arm 14, that is held adjustably by set screw $14^a$ to the shaft 11. The shaft 11 turns with cone bearings in the ends of screws 15 and 16, held from the base 17, on suitable posts 18 and 19. The spring 1, (and all the springs of the series), is made flexible and made with a considerable range of movement so that the free end swings through a large arc under the actuating influence of the fluid entering through the pipe 10. This motion is communicated to the rock shaft 11, upon which all the other springs of the battery act in the same way, and thus give to the rock shaft 11 a large oscillating movement, which has the force or strength due to the united action of all the springs of the battery. The shaft 11 carries the recording pencil 20 at the end of an arm 21, and the pressure of the pencil upon the card or record sheet may be regulated by a spring 22, and an adjusting screw 23. A supporting arm 24, is carried by the same rock shaft and remains constantly in position parallel to the arm 21, with a small pressure plate 25, bearing against the back of the card or record sheet just opposite the pencil point. The record sheet itself is supported on the shaft 26, actuated by a clock work, in the case 27. A large disk 28 (Fig. 1) over which the record sheet turns freely serves to support the sheet. The arms 21 and 24 are balanced by counter weights 30 and 31.

In both the forms described, the arrangement of the tubes and the links connected with the end of each tube, is such that the tubes either adjust themselves to compensate for small variations in flexibility, especially those small variations at the initial part of the flexible movement, or they are readily adjusted to compensate for any such variations. In the form shown in Fig. 1, the movement which produces the rocking of the shaft $1^d$ is transmitted through the links which lie between the ends of the tubes and the shaft, or the arm to which the link is attached; each tube is capable of adjusting itself with respect to the other tubes to compensate for any slight variation of its primary or initial movement. Thus for example, if the second tube $b$ begins to open under the slightly less pressure than the tube $d$ would open at, the end of the tube swings out, causing the links connecting the ends of the several tubes to assume a slightly different angular relation to each other than that which they would assume under another variation of pressure, and this is true of each of the tubes in this form of assemblage; the apparatus being self-adjusting in this respect for slight variations at the initial part of the movement. In the form shown in Fig. 2, the tubes are not self-adjusting, but are readily adjusted to compensate for any variation of this character by changing the length of the links, and thus the same result is produced by manual adjustment in this case that is produced in the other case by the self-adjustment.

What I claim is:—

1. In a pressure gage, in combination with a manifold, a plurality of coaxially arranged Bourdon tubes communicating therewith, a rock shaft, links connecting the free ends of the Bourdon tubes to the rock shaft whereby the united action of the tubes is communicated to the shaft, and means actuated by the shaft for recording the movement thereof and thereby of said Bourdon tubes, substantially as described.

2. In a pressure gage, the combination of a manifold, a plurality of Bourdon tubes having their open ends communicating therewith, a rock shaft, a recording instrument actuated by said rock shaft, and adjustable connecting links between said rock shaft and Bourdon tubes, whereby compensation is made for initial irregularities of movement in said tubes, substantially as described.

3. In a pressure gage, in combination with a manifold, a plurality of Bourdon spring tubes communicating therewith, a rock shaft, and links whereby the individual movement of each tube is communicated in proper proportion and degree to said shaft, substantially as described.

In testimony whereof, I sign this specification in the presence of two witnesses.

EBEN S. WHEELER.

Witnesses:
CHARLES F. BURTON,
MAY E. KOTT.